United States Patent
Kraljic et al.

(10) Patent No.: US 9,513,979 B2
(45) Date of Patent: Dec. 6, 2016

(54) MOBILE COMMUNICATION DEVICE PROVIDING INTERCONNECTIVITY BETWEEN APPS BASED ON STORAGE SCOPE

(71) Applicants: Kristian Kraljic, Bad Schoenborn (DE); Stefan Vormbrock, Wiesloch (DE)

(72) Inventors: Kristian Kraljic, Bad Schoenborn (DE); Stefan Vormbrock, Wiesloch (DE)

(73) Assignee: SAP SE, Walldorf (DE)

( * ) Notice: Subject to any disclaimer, the term of this patent is extended or adjusted under 35 U.S.C. 154(b) by 426 days.

(21) Appl. No.: 13/739,853

(22) Filed: Jan. 11, 2013

(65) Prior Publication Data
US 2014/0201760 A1    Jul. 17, 2014

(51) Int. Cl.
| | |
|---|---|
| G06F 9/46 | (2006.01) |
| G06F 9/54 | (2006.01) |
| H04W 4/00 | (2009.01) |
| G06F 9/44 | (2006.01) |
| G06Q 10/06 | (2012.01) |
| G06F 21/62 | (2013.01) |

(52) U.S. Cl.
CPC ............. *G06F 9/543* (2013.01); *G06F 8/316* (2013.01); *G06F 21/629* (2013.01); *G06Q 10/06* (2013.01); *H04W 4/003* (2013.01); *G06F 21/6218* (2013.01)

(58) Field of Classification Search
USPC ............. 718/1, 108; 717/107, 178; 455/403, 455/456.1, 456.4, 418, 419, 420; 709/203
See application file for complete search history.

(56) References Cited

U.S. PATENT DOCUMENTS

| | | | | |
|---|---|---|---|---|
| 8,261,231 | B1 * | 9/2012 | Hirsch et al. .................. | 717/100 |
| 8,656,353 | B2 * | 2/2014 | Brendza et al. ............... | 717/109 |
| 9,002,864 | B1 * | 4/2015 | Payne ............... | G06F 17/30876 707/756 |
| 9,063,792 | B2 * | 6/2015 | Ali .......................... | G06F 9/5077 |
| 2006/0195476 | A1 * | 8/2006 | Nori ................... | G06F 17/30607 |
| 2006/0195477 | A1 * | 8/2006 | Deem ................. | G06F 17/3056 |
| 2006/0271449 | A1 * | 11/2006 | Oliver ................... | G06Q 20/123 705/27.1 |
| 2011/0314004 | A1 * | 12/2011 | Mehta ................ | G06F 17/30017 707/723 |
| 2012/0089906 | A1 * | 4/2012 | Reeves ............... | H04L 67/1095 715/255 |
| 2012/0159388 | A1 * | 6/2012 | Chalouhi .......... | G06F 17/30029 715/810 |
| 2012/0221955 | A1 * | 8/2012 | Raleigh ................. | H04M 15/00 715/736 |
| 2012/0311525 | A1 * | 12/2012 | Xoual .................... | G06F 21/629 717/104 |
| 2012/0311564 | A1 * | 12/2012 | Khalid ...................... | G06F 8/61 718/1 |
| 2013/0166649 | A1 * | 6/2013 | Atzmon et al. ............... | 709/204 |
| 2013/0178241 | A1 * | 7/2013 | Duggirala ............. | H04W 4/003 455/550.1 |
| 2013/0226878 | A1 * | 8/2013 | Sankaranarayanan .. | G06F 9/542 707/689 |
| 2013/0231093 | A1 * | 9/2013 | Toy ......................... | H04W 4/00 455/414.1 |
| 2013/0318207 | A1 * | 11/2013 | Dotter ........................... | 709/219 |
| 2014/0018048 | A1 * | 1/2014 | Anand .................. | H04W 4/003 455/414.1 |
| 2014/0164520 | A1 * | 6/2014 | Fan ...................... | H04L 67/1095 709/204 |
| 2014/0282119 | A1 * | 9/2014 | Wouhaybi et al. ........... | 715/760 |
| 2015/0261960 | A1 * | 9/2015 | Aad ....................... | G06F 21/577 726/25 |

FOREIGN PATENT DOCUMENTS

| | | | | | |
|---|---|---|---|---|---|
| FR | EP 2523436 | A1 * | 11/2012 | ........ | H04M 1/72563 |
| KR | WO2013100990 | A1 * | 7/2013 | .................... | 715/760 |

OTHER PUBLICATIONS

IP.com, Method for Interapp Communication Between Apps Across Mobile Devices, 2012, IP.com, pp. 1-5.*

*Primary Examiner* — Abu Ghaffari

(74) *Attorney, Agent, or Firm* — Schwegman Lundberg & Woessner, P.A.

(57) ABSTRACT

A method and system include a backend mobile development framework. The framework includes a library having a plurality of apps for mobile devices, the apps divided into groups of related apps. A communications module is operable to communicate with multiple mobile devices. A data store provides interconnectivity between apps in each group such that a first app has content information shared with a second app.

16 Claims, 6 Drawing Sheets

```
/* Create an object for the current app */
505 — SDH_App app = new SDH_App(IOS, 'support', 120, 'Test Application', ...)
/* Initialize the framework */
510 — SDH_Framework framework = SDH_Framework=>getInstance(app)
/* Create a delegate for the logon class, which fills the logon variable */
515 — SDH_Logon logon = nil;
520 — SDH_Logon_Deleage delegate = new SDH_Logon_Delegate( ... ) { ... }
/* Let the user enter logon information for the backend connection */
525 — SDH_Frontend=>displayLogon(nil, [PASSWORD], delegate)
/* Create an initial backend connection */
530 — SDH_Framework_Connection framework_connection = framework->getConnection(INTERN,nil,logon)
/* Get a list of all apps in the app group */
535 — SDH_Apps apps = framework->getApps(framework_connection)
/* Get a storage object for all stored values of the user */
540 — SDH_Storage storage = framework->getStorage(framework_connection)
/* Read and write a value from the storage service */
545 — storage->put('count', storage->get('count') + 1)
/* Create the system specification for a backend system */
550 — SDH_System system = new SDH_System('CSS', 'https://css.wdf.sap.corp')
/* Connect to the system and call a custom web service */
555 — SDH_Connection connection = new SDH_Connection(system, logon)
/* Create a service object for calling the web service on this connection */
560 — SDH_Service service = connection->getService('/sap/bc/webservice', ANY)
/* Create a plain request object, to request data from the web service */
565 — SDH_Request request = new SDH_Plain_Request(POST)
570 — request->addField(new SDH_Request_Field('language', 'DE'))
575 — request->setBody('data=Hello World')
580 — SDH_Response response = service->call(request)
...
```

*FIG. 5*

MOBILE COMMUNICATION DEVICE PROVIDING INTERCONNECTIVITY BETWEEN APPS BASED ON STORAGE SCOPE

BACKGROUND

When creating mobile applications, regardless of the platform used, enterprise business applications involve the development of many components, such as secure connectivity, front end components, web service access, central data storage, and distributed master date access. These components are usually created all over again for each application being developed. Further, apps are generally built as stand-alone applications for each functional purpose. Unlike larger scale solutions or systems, apps are mostly not connected to each other, which leads to a very disrupted user experience.

SUMMARY

A method and system include a backend mobile development framework. The framework includes a library to be used in a plurality of apps for mobile devices, the apps divided into groups of related apps. A communications module is operable to communicate with multiple mobile devices. A data store provides interconnectivity between apps in each group such that a first app has context information shared with a second app.

A method includes running a first app on a mobile device, switching from the first app to a second app, and providing the context information from the first app to the second app. In one embodiment first app context information is sent to a back end and then sent to the second app. Further embodiments include limitations on information that is transferable between apps.

A computer readable storage device having instructions for causing a computer to perform a method, the method including managing a library having a plurality of apps for mobile devices, the apps divided into groups of related apps, communicating with multiple mobile devices running apps, and providing interconnectivity between apps in each group such that a first app has context information shared with a second app.

BRIEF DESCRIPTION OF THE DRAWINGS

FIG. 5 illustrates a library usage example according to an example embodiment.

DETAILED DESCRIPTION

Figure 1:
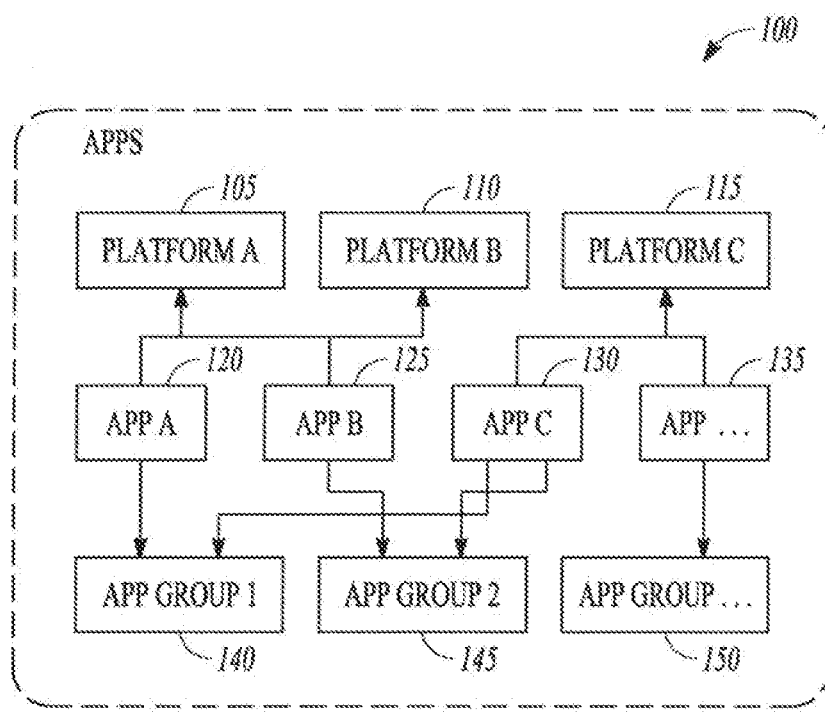
FIG. 1 is a block diagram of an app architecture framework according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of die present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules us desired, and the embodiments described are merely examples. The software may be executed on a digital signal processor, ASIC, microprocessor, or other type of processor operating on a computer system, such as a personal computer, server or other computer system.

Context switching between apps is provided for a mobile device. Context switching allows data to be transferred between selected apps such that switching between apps may be seamless to a user of the mobile device. An example includes a first app to look up data related to a customer. Once the data is found by the first app, a second app may be used to contact the customer. Context switching transfers contact information, the context, of the first app to the second app, so the user does not have to enter or search for the contact information again m the second app.

In further embodiments, switching between apps may be done without transfer of context information. For example, if a user just wants to look up something in a company's schedule and there is a specific "Company Schedule App", a function may be included to just switch to the Company Schedule App, without sharing context information. Such a function is later described as "App Switcher", a frontend component just used to switch between apps of a same app group, without transferring information between the apps.

In prior devices, the functions of the first app and the second app may have been incorporated into a single app. However, with sometimes thousands of apps associated with an underlying enterprise management system or other software platform, combining many apps into a single app can be difficult to do, and may result in an app that is too large to effectively run on a mobile device and too complex to implement for a company (if one single component of thousands of components is changed. Such changes may result in the whole app having to be re-compiled and shipped to the customer. Large apps can also be very hard to support given a software lifecycle process.

A backend, framework, and client library are defined, and may be adapted and implemented for any type of platform available. The backend framework includes a data store and application access to provide inter-app connectivity. The framework provides web services for master data access and remote procedure calls (RPC) such as to an underlying enterprise resource management system. The RPC may also be used to access further data of a company that is network connected. Client libraries provide access to standardized objects used for establishing a backend connection, performing web service calls in an arbitrary number of formats, receiving master data, and other services. Various embodiments and implementations provide the ability to speed up, simplify, and standardize the development and reduce the cost of developing mobile applications.

In various embodiment, a mobile development framework is both a backend solution to easily connect and administer mobile products and an integrated framework to simply the connectivity process and data administration on mobile devices. The backend infrastructure facilitates administration and tracking uses of a mobile framework. The infrastructure may be used to access information from the backend and to manage mobile clients. A device framework may be integrated in mobile projects. A library provides access to mandatory functionalities such as connectivity, data storage and the component to switch between apps, providing inter app connectivity.

FIG. 1 is a block diagram of an app architecture framework 100. Several different platforms on which apps may run are illustrated at platform A at 105, platform B at 110, and platform C at 115. A plurality of apps, A, B, C . . . , are indicated at 120, 125, 130, and 135. More apps as well as platforms may be included in further embodiments. The apps are coupled to platforms by lines, indicative of which platforms each app is capable of running on. Example platforms include Apple iOS, Google Android, Microsoft Windows Phone OS/Windows Mobile/Windows 8, Nokia Symbian OS, RIM Blackberry OS, HP Web OS, and others. In addition, apps are also shown as related to different groups of apps as indicated at 140, 145, and 150. Apps are thus able to run on more than one platform, and may also belong to more than one group.

Figure 2A:
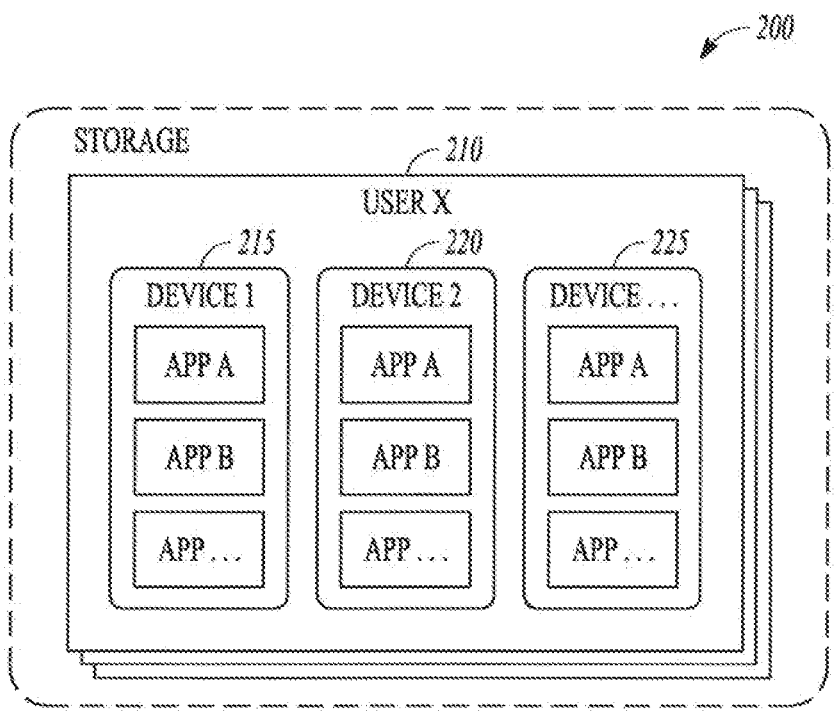
FIG. 2A is a block diagram illustrating a storage framework according to an example embodiment.

FIG. 2A is a block diagram illustrating a storage framework 200. Storage for a user X is indicated on an information page 210. Several other users may also be included in storage framework 200, as indicated by pages mostly covered by page 210. User X is shown as having multiple devices 215, 220, 225 each capable of running multiple apps A, B, . . . . If app A stores data, the data may be managed with several different storage scopes of access provided.

Figure 2B:
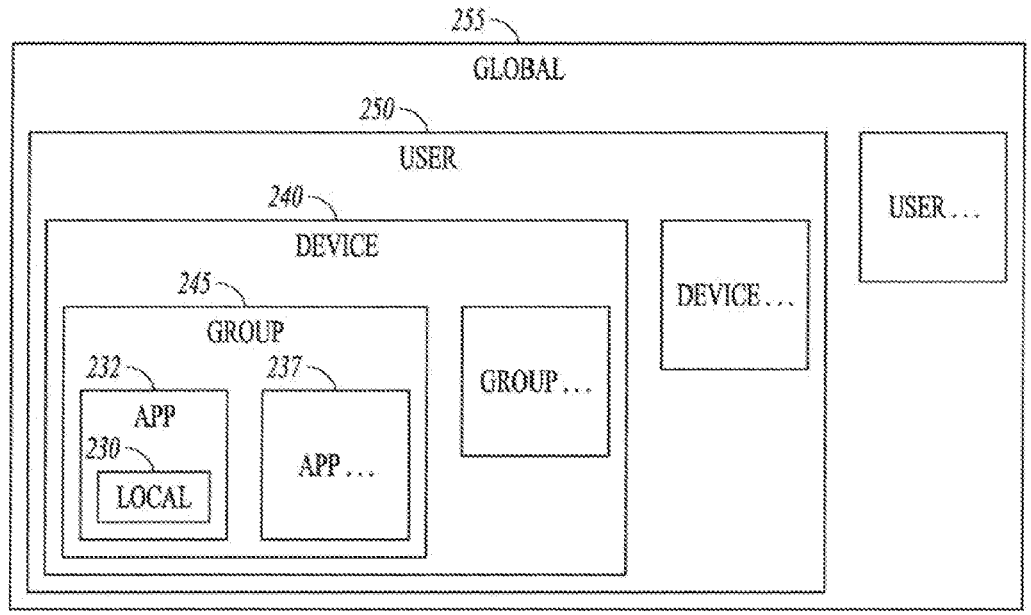
FIG. 2B is a block diagram illustrating access restrictions based on storage scope according to an example embodiment.

FIG. 2B is a block diagram illustrating access restrictions based on storage scope. A LOCAL storage scope 230 is only readable by app A 232 on the device on which it is stored. An APP storage scope 135 is readable by app A 232, 237 residing on any of the devices. A DEVICE storage scope 240 provides for readability of the data by all apps 232, 237 on the same device. Device storage scope 241 is also illustrated. A GROUP storage scope 245, 246 enables reading of data by all apps of the same app group regardless of the device on which an app in the group is running A USER storage scope 250, 251 provides for the readability of the stored data by all apps of any group of the user. Finally, a GLOBAL storage scope 255 provides for the readability of the stored data by all apps of any group by all users.

Generally the framework is split into two pieces. The first part is the on-device library, which is natively available for each client platform. The second part is the backend framework, which includes multiple standard simple object access protocol (SOAP) web services provided in typical backend systems. SOAP provides a protocol for exchanging structured information in the implementation of web services in a computer network utilizing an extensible markup language (XML) for message format, hypertext transfer protocol (HTTP) and simple mail transfer protocol (SMTP) for messages. In further embodiments, different protocols may be used for exchanging information, such as any kind of HTTP communication. Custom backend frameworks may be implemented by anyone.

Data is generally stored in the backend. Therefore a logon to the backend system may be used to maintain data security. In the default case, this logon may work using a certificate logon. Functionality of the library is designed to work online. Going offline during the process will drop a connection, which may be reinitiated, if the library functionality is used again.

Connections to systems different to the backend framework system will be initiated by the client on request. Access to backend systems can be made by using web services.

In one embodiment, the system may be implemented as mobile development framework client side libraries, and operates as a template for library developers on any platform. The system follows a client/server approach. On the server side, the system provides a web service based framework (referred to as a 'framework'), which provides functionalities to store/retrieve data and to access master data. On client side, for each mobile device, there is a client library implementation to support and simplify the app development process. The following paragraphs describe an on-device library implementation, the backend framework, and describe the communication interaction using web services.

Implementing the on-device library on arty platform, may utilize a platform specific adaption. Sometimes device capabilities may entail changing certain library functionalities.

Figure 3:
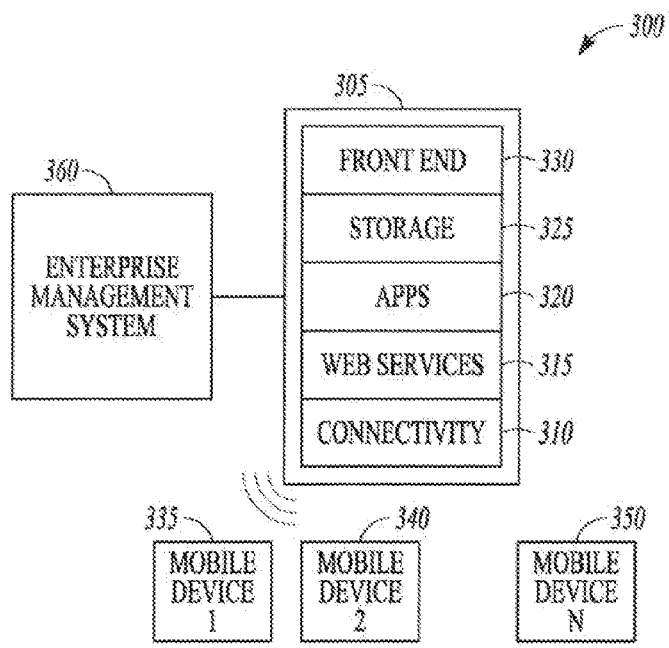
FIG. 3 is a block diagram illustrating functional layers of a backend system according to an example embodiment.

Systems functionality may be divided into five main layers as illustrated at 300 in block diagram form in FIG. 3. The layers include connectivity 310, web services 315, apps 320, storage 325, and frontend 330. In one embodiment, the layers as illustrated correspond to a backend system 305. Corresponding layers may be implemented on multiple mobile devices indicated at 335, 340, and 350 which communicate with the backend system.

The connectivity layer 310 simplifies the connection establishment to the backend, authorizations and secure communication. In addition the connectivity layer 310 can be used to initiate a connection to any backend system, and check the connection for validity. The connection methods should simplify and unify the process of connecting to the backend systems especially using certificate logons.

The web service layer 315 encapsulates backend web services and can be used to send requests, retrieve, and interpret web service responses. The web service layer 315 can be used to retrieve any kind of web service in general. In further embodiments, the web service layer 315 may be used by the library itself to connect to the backend and receive, for example, the information for the context of the user. Web services of the mobile development framework may be accessed using build in library functionality more easily. Requests and responses can be sent and received in a binary format, but the library should offer simplified possibilities of accessing XML, JSON and WSDL web services, or any other kind of format, used in a company.

The apps 320 part of the library manages connected apps. An app may be assigned to an app group. In an app group each app may switch to installed apps of the same app group. Data can be exchanged rising device functionality or the storage layer. The apps layer can also be used to organize and group apps into views. In one embodiment, the apps layer knows which apps are generally available for the current mobile platform (in an app group, or generally the whole company), even if the apps are not installed on the local device.

The storage 325 part of the library is used to store data for certain users in different scope levels in the backend system or locally. Locally stored data can only be accessed by the app which stared the data and does not require a backend connection. Globally stored data may be stored on different scope levels, such as: Local, Device, App, Group, User, Global.

The frontend 330 layer provides simplified possibilities to display any kind of standard dialogs. For example it offers possibilities to display logon screens, or a screen to simplify the switching between different apps of an app group. Also it should provide a possibility to display a unique guided help screen for all applications. Another example used in nearly every mobile application would be an "Abut Dialog" displaying development/company or support information.

In one embodiment, the apps running on the mobile devices interact with both the backend system 305 and an underlying application running on a system 360, such as an enterprise management system. In one embodiment, the apps provide a mobile interface to data in the enterprise resource management system and may also cause data to be written to the system 360.

Figure 4B:
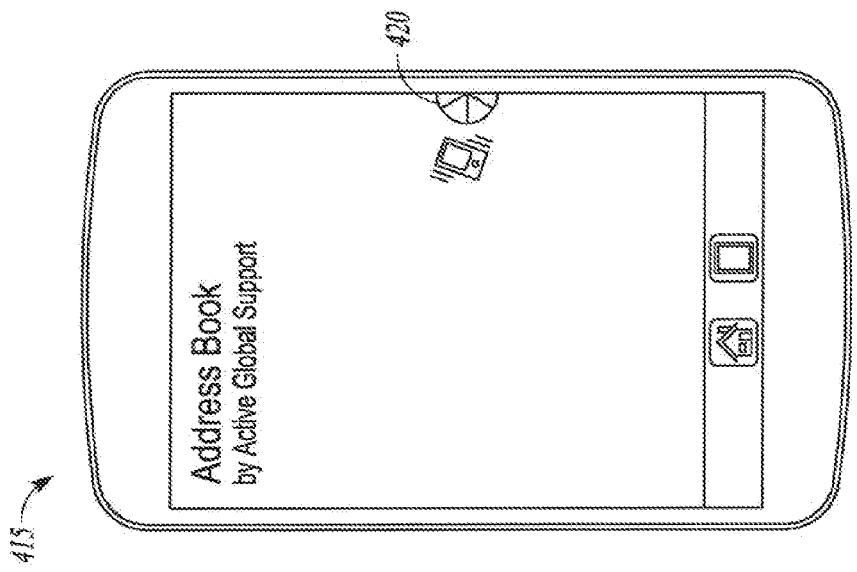
FIGS. 4A, 4B, 4C, and 4D illustrate display of groups of apps on mobile devices according to an example embodiment.
Figure 4A:
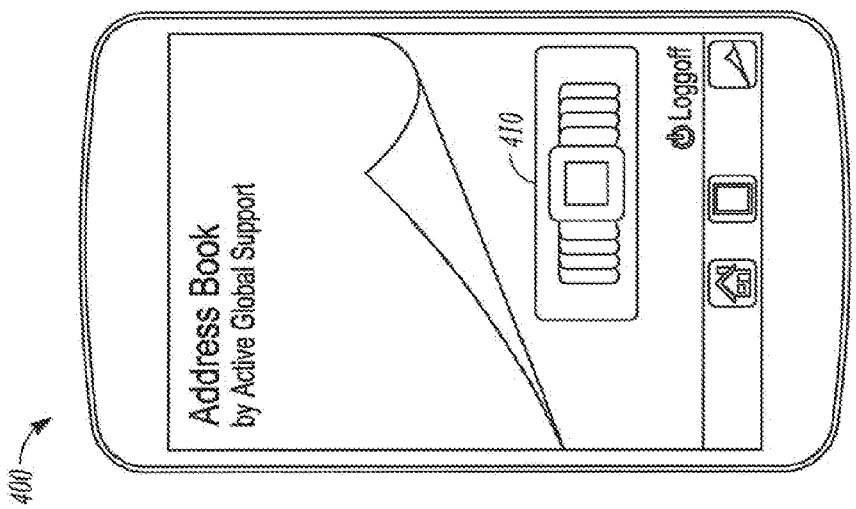
Figure 4D:
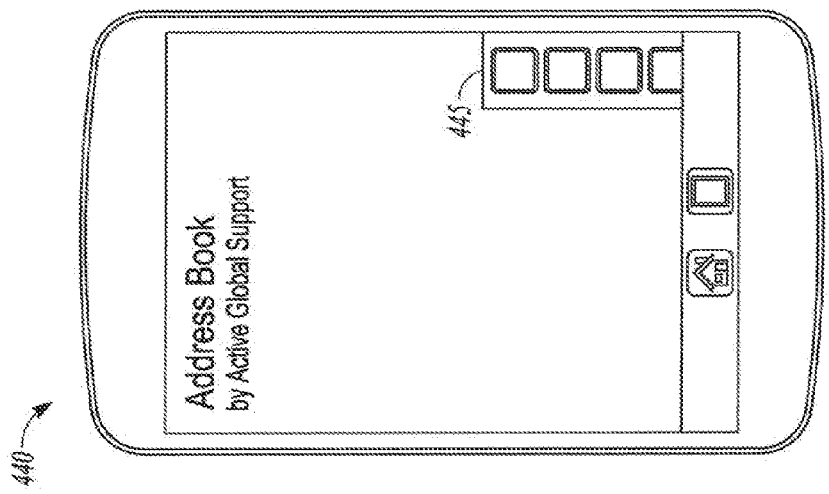
Figure 4C:
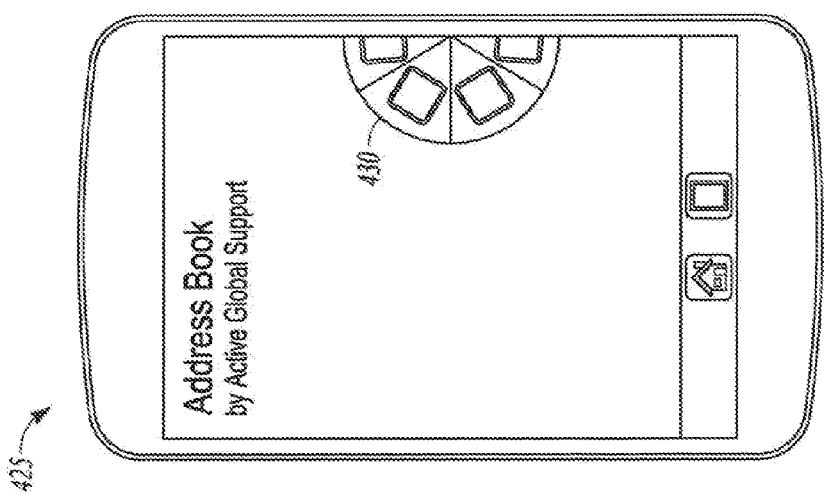

In one embodiment, the device framework provides an integrated framework and an app library. The app library includes a user interface to access and switch between different apps. Once the apps are categorized into different apps, all apps of an app group may be displayed on the mobile device in one of many different ways. FIGS. 4A, 4B, 4C, and 4D. A hand held mobile device or touchpad is indicated at 400 in FIG. 4A, and includes a peel back page of one app, an address book. When the page is peeled back, a list of icons 410 corresponding to other apps in the group is revealed. Similarly in FIG. 4B, a mobile device 415 is displaying the address app, and an app wheel icon 420 indicates art icon winch may be selected or shacked so reveal other apps in the group, as indicated in FIG. 4C on mobile device 425. The other apps are shown as a rotatable icon wheel 430, providing access to the other apps in the group. In FIG. 4D, mobile device 440 shows the address app on top of a display screen, with a list of other apps 445 in the group. This list may also be scrolled to see icons allowing switching between apps in the group. Several other types of user interlace constructs may be used in further embodiments, from pull-down menus to a page of fixed icons accessible through a button or touch screen artifact.

Apps which are not installed on the device can be installed using the app library. In one embodiment, installed apps that have been recently accessed may be displayed first in the various user interface constructs. In further embodiments, a quick switch and favorite app lists may be provided. If a new app is available in an app group, the new app is promotable to the mobile device using the framework.

The framework also provides the ability to connect to the backend system on demand or on app start. Backend systems may be connected to internally, or externally. Generally company networks are secured and not accessible from the Internet. So mobile devices (generally always connected to the internet, has only partially to the internal company network) are not able to access the critical business/master data systems when necessary. Therefore the backend implementation/framework offers the opportunity to connect either only "internally" if a user is connected to the Company Network, or also externally if a user is accessing from the internet in a secure manner. In some embodiments, an app may provide the ability to connect using a default user, using a username and password combination, using certificates or using certificate authorization such as for example SSO, or using the library without a backend connection. The framework provides dialogs to logon. The backend in one embodiment stores data associated with the apps, providing the ability to share contexts when switching between selected apps on the mobile device. In further embodiments, web services and function modules may be called in the backend to provide data to apps and groups of apps.

To realize the library functionality following classes may be implemented by a library developer on each platform:

Framework: The 'Framework' class is backend class for the central functionality of this framework. It should be used to connect to the backend, in case framework backend information (apps, storage, data) should be consumed. If only third-party systems should be called or only local features of the library will be used, a backend connection is not mandatory. Most of the libraries classes can be initialized using only 'Framework' methods. The framework class should be instantiated only once during the runtime of the app. A framework instance is always related to the local app and must therefore be instantiated with the app definition of the app the library is used in.

Logon: The 'Logon' class represents given login credentials for a connection. It handles authentications using username, password or certificates. Using the class global keychain information can be accessed. Values or certificates stored in the local or global keychain can be received easily. For debug purpose a local certificate may be provided.

The class is mainly used in a 'Service' class and connected. It manages and initialized logon information to systems. The Logon class manages the different login capabilities to a backend system. At the moment NO, CERTIFICATE and PASSWORD are supported. The class stores username and password and/or certificate information.

System: System data of a backend system to connect to. The System class manages system information necessary to connect to backend systems via web service. This means it holds an URL and is able to do a ping to the web server.

Connector: Used to initialize and open connections to a backend system. The Connector class can be used to manage systems and open connections to systems specified in the connector class. This class should be prefilled by the library developer with generally available backend systems.

Connection: An opened backend connection, used to create web service requests. The Connection class defines a connection to a backend system and can be used to get a service connection to the system. The connection is automatically checked (ping) as it is instantiated.

Framework Connection: A special connection object to the backend Framework. The Framework Connection class is a special connection class used to connect to the backend framework system. It simplifies the process of creating the services for the client library.

Service: Service is a generic object describing a backend web Service. The Service class represents a single web service object in the backend and is able to call the web service by sending a Request object to the server and returning the corresponding Response after the result has been received.

Apps Service: Special service describing the Apps part of the framework. The Apps Service class is a simplified service wrapper for the Apps functionality of the backend framework system.

Storage Service: Special service describing the Storage part of the framework. The Store Service class is a simplified service wrapper for the Storage functionality of the backend framework system. Further details of attributes and methods are included to help describe use of the different storage modes.

In a further embodiment, a different set of classes may be used, some of which are the same as in the above set of classes.

Framework: Central framework classes, used to initiate a framework connection

Logon: Manages and initialized logon information to systems

Service: Service is a generic object describing a backend web service

Request: General HTTP request of a web service in raw data format

RequestText: Text based request

RequestXML: Request with XML data

RequestWSDL: Request with WSDL data

RequestJSON: Request with JSON data

RequestOData: Request with OData protocol

Response: HTTP response object of a web service call in raw data format

ResponseText: Text based response

ResponseXML: Response with XML data

ResponseWSDL: Response with WSDL data

ResponseJSON: Response with JSON data

ResponseOData: Response from OData protocol

Apps: The Apps class manages all apps of a certain app group and user views

App: App objects manage all attributes of an app and allows to switch between them View: View objects can be used to manage and organize apps into views Storage: The central storage class is used to store data of the user in the backend Attribute: Only attribute objects can be stored in the backend Data: Simplification to access backend web services and master data Frontend: The frontend part displays generally available dialogs to the user Annotation: An annotation is a class used to display guided help values Data Service: Special service describing the Data part of the framework. The Data Service class is a simplified service wrapper for the Data functionality of the backend framework system. It is used to access general available master data from the backend systems, such as customers, installations and systems.

Request: General HTTP request of a web service in raw data format. The Request class encapsulates all parameters of an regular HTTP call. All attributes may be send to a server in case the request is used in an web service call. All attributes should be send using the HTTP/1.1 standard.

Response: HTTP response object of a web service call in raw data format. The Response class encapsulates all parameters of an regular HTTP response. All attributes may be set in case a response was received from a web service call. All attributes should be parsed according to the HTTP/1.1 standard.

Plain Request: As Request in a character typed format in a certain code page. The Plain Request class is an enhancement of the Request class and manages the conversion of plain text messages into binary format in a certain code page.

Plain Response: As Response in a parsed character typed format. The Plain Response class is encapsulates the Response class and can be used to retrieve character encoded data from the response, not only the binary representation.

XML Request: In reference to Plain Request, offers a parsed XML object. The XML Request class is an enhancement of the Plain Request class and manages the conversion of XML messages into plain text format. For example the class of the document field could be a defined standard class available on the libraries target platform to parse XML messages.

XML Response: In reference to Plain Response, offers a parsed XML object. The XML Response class is encapsulates the Plain Response class and can be used to retrieve a pursed XML object from the plain text response object.

JSON Request: In reference to Plain Request, offers a parsed JSON object. The WSDL Request class is an enhancement of the XML Request class and simplifies the request creation for WSDL web services. The class can be used to load existing WSDL description and set the attributes of the WSDL before sending the request.

JSON Response: In reference to Plain Response, offers a JSON Object. The JSON Response class is encapsulates the Plain Response class and can be used to retrieve a parsed JSON object from the plain response object.

WSDL Request: in reference to XML Request, to simplify parse and Request.

WSDL Response: In reference to XML Response, accessing returned data. The WSDL Response class is encapsulates the XML Response class and can be used to retrieve a parsed WSDL object from the XML response object. It can be used the directly to retrieve result fields from the WSDL content.

Apps: The Apps class manages all apps of a certain app group and user views. The Apps class manage all apps references of one app group. The apps of a group are retrieved by a backend web service and parsed as App objects. Apps can be organized in views and stored in the backend using this class as well.

App: App objects manage all attributes of an app and allows to switch between them. The App class is an immutable class containing all information of an app object. Generally one of these objects has to be created at the start of the app, so the framework can be initialized calling the getInstance method of the Framework class.

View: View objects can be used to manage and organize apps into views. The View class is used to manage and group apps into views. A view is always created for one user and is platform independent. If a view contains an app which is not available for the current platform (not in the Apps list of apps), it should not be taken into account.

Storage: The central storage class is used to store data of the user in the backend. The Storage class is used to store data in the backend framework.

Attribute: Only attribute objects can be stored in the backend. The Attribute class is an immutable class holding key/value parameter pairs.

Frontend: The frontend part displays generally available dialogs to the user. The Frontend class offers static methods for displaying delimit frontend components on the mobile devices.

Annotation: An annotation is a class used to display guided help values. The Annotation class is used to put an annotation to any position on the screen. The position is thereby the pixel value from the upper left corner of the display. An arrow to the position with the annotated text should be displayed.

The example previously referenced, where one app is used to find a customer and the context is transferred to a second app used to contact the customer, such as via email may correspond to app B 125 and app C 130 as seen in FIG. 1. Apps B and C are associated with App Group 2 at 145 in FIG. 1, and may have store scopes or modes of Local, Device, App, Group, User, Global to enable the sharing of the context as described with respect to FIG. 2. A storage scope of APP would not allow two different apps to share data representative of the context in which the app was being used. The use of the different storage mode in combination with the grouping and ability to switch between apps allows for management of multiple apps and without having the user have to switch the apps/applications manually and thus losing the current context.

A library usage example is illustrated in pseudo code at 500 in FIG. 5. This library example 500 provides a general usage of the library described in pseudo code. In a fictive scenario the client library will be initialized, stored values are read from the backend and the app switches to another app of the same app group.

In detail at 305, an object is created for a current app, referred to as "Test Application." In one embodiment, apps are identified not by its name (because it may be different/ locale specific) but by a unique so called "App ID" stored in the backend. In the example the "App ID" is visible as a number "120". In one embodiment, an 8-digit randomly generated character string may be used for each app. To switch between apps this "App ID" identifies all applications.

At 510, a framework is initialized. At 515 and 520, a delegate for a logon class is created, filling in a logon variable. At 525, the template is set to let a user enter logon information for the backend connection. The initial backend connection is then created at 530. A list of apps in an app group are then obtained at 535. At 540, a storage object for all stored values of the user are then obtained.

At 545, a value from the storage service is then read and written. At 550, a system specification for a backend system is created. At 555, the backend system is connected to, and a call is made to a custom web service. A service object for calling the web service on the connection is then created at 560. A plain request object is created at 565 to request data from the web service, followed by a request to add a field at 570, a request to set a body, in this case a message consisting of "Hello World", and a call to receive a response at 580.

Figure 6:
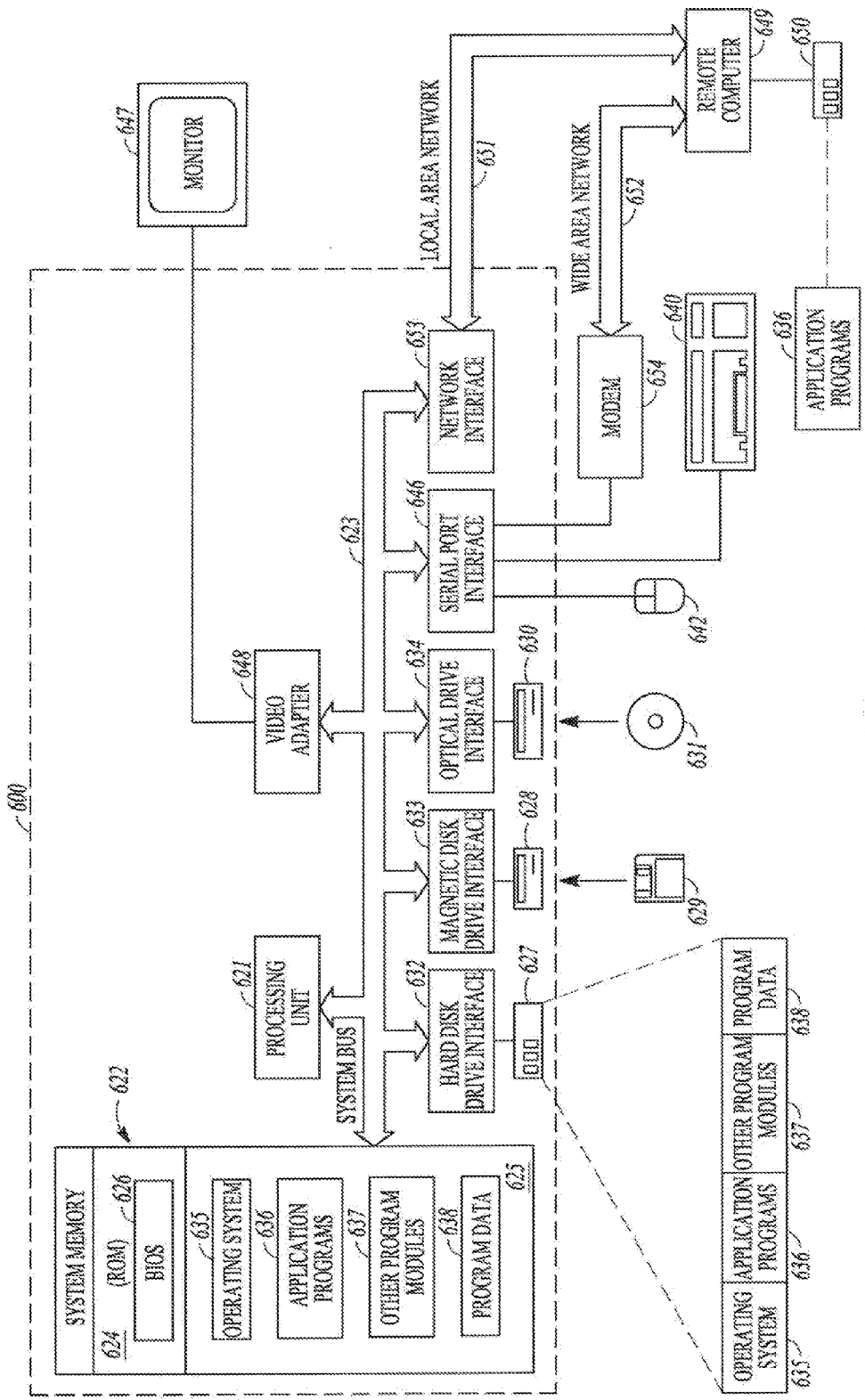
FIG. 6 is a block diagram illustrating a computer system for implementing methods and devices according to an example embodiment.

FIG. 6 is a block diagram of a computer system to implement methods according to an example embodiment. In the embodiment shown in FIG. 6, a hardware and operating environment is provided that is applicable to any of the systems or backends and for performing methods according to example embodiments. Many of the components may not be needed for implementing mobile devices such as tablets and smart phones. Input devices may include touch screens and various sensors commonly found in mobile devices.

As shown in FIG. 6, one embodiment of the hardware and operating environment includes a general purpose computing device in the form of a computer 600 (e.g., a personal computer, workstation, or server), including one or more processing units 621, a system memory 622, and a system bus 623 that operatively couples various system components including the system memory 622 to the processing unit 621. There may be only one or there may be more than one processing unit 621, such that the processor of computer 600 comprises a single central-processing unit (CPU), or a plurality of processing units, commonly referred to as a multiprocessor or parallel-processor environment. In various embodiments, computer 600 is a conventional computer, a distributed computer, or any other type of computer, such as a mobile device including touchscreen.

The system bus 623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 624 and random-access memory (RAM) 625. A basic input/output system (BIOS) program 626, containing the basic routines that help to transfer information between elements within the computer 600, such as during start-up, may be stored in ROM 624. The computer 600 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 couple with a hard disk drive interface 632, a magnetic disk drive interlace 633, and an optical disk drive interface 634, respectively. The drives and their associated computer-readable media provide non volatile storage of computer-readable instructions, data structures, program modules and other data for the computer 600. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 629, optical disk 631, ROM 624, or RAM 625, including an operating system 635, one or more application programs 636, other program modules 637, and program data 638. Programming for implementing one or more processes or method described herein may be resident on any one or number of these computer-readable media.

A user may enter commands and information into computer 600 through input devices such as a keyboard 640 and pointing device 642. Other input devices (not shown) can include a microphone, joystick, game pad, satellite dish, scanner, or the like. These other input devices are often connected to the processing unit 621 through a serial port interface 646 that is coupled to the system bus 623, but can be connected by other interfaces, such as a parallel port, game port, or a universal serial bus (USB). A monitor 647 or other type of display device can also be connected to the system bus 623 via an interface, such as a video adapter 648. The monitor 647 can display a graphical user interface for the user. In mobile devices, the display may be a touch screen. In addition to the monitor 647, computers typically include other peripheral output devices (not shown), such as speakers and printers.

The computer 600 may operate in a networked environment using logical connections to one or more remote computers or servers, such as remote computer 649. These logical connections are achieved by a communication device coupled to or a part of the computer 600; the invention is not limited to a particular type of communications device. The remote computer 649 can be another computer, a server, a router, a network PC, a client, a peer device, a mobile device, or other common network node, and typically includes many or all of the elements described above I/O relative to the computer 600, although only a memory storage device 650 has been illustrated. The logical connections depicted in FIG. 6 include a local area network (LAN)

651, a wide area network (WAN) 652. The networks are also representative of a mobile device transceiver for communicating via WiFi and other mobile communication protocols. Such networking environments are commonplace in office networks, enterprise-wide computer networks, intranets and the internet, which are all types of networks.

When used in a LAN-networking environment, the computer 600 is connected to the LAN 651 through a network interlace or adapter 653, which is one type of communications device. In some embodiments, when used in a WAN-networking environment, the computer 600 typically includes a modem 654 (another type of communications device) or any other type of communications device, e.g., a wireless transceiver, for establishing communications over the wide-area network 652, such as the internet. The modem 654, which may be internal or external, is connected to the system bus 623 via the serial port interface 646. In a networked environment, program modules depicted relative to the computer 600 can be stored in the remote memory storage device 650 of remote computer, or server 649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol and any other electronic media through any suitable switches, routers, outlets and power lines, as the same are known and understood by one of ordinary skill in the art.

Examples

1. A system comprising:
a backend mobile development framework including:
    a library having a plurality of apps for mobile devices, the apps divided into groups of related apps;
    a communications module to communicate with multiple mobile devices; and
    a data store providing interconnectivity between apps in each group such that, a first app has context information shared with a second app.

2. The system of example 1 wherein the datastore comprises multiple storage scopes, including a LOCAL storage scope where data corresponding to an app is readable only by the app running on a single mobile device.

3. The system of any of examples 1-2 wherein the datastore comprises multiple storage scopes, including a DEVICE storage scope where data corresponding to a mobile device is readable by all apps on the mobile device.

4. The system of any of examples 1-3 wherein the datastore comprises multiple storage scopes, including an APP storage scope where data is readable by an app running on any mobile device.

5. The system of any of examples 1-4 wherein the datastore comprises multiple storage scopes, including a GROUP storage scope where data is readable by all apps on all mobile devices in the same app group.

6. The system of any of examples 1-5 wherein the datastore comprises multiple storage scopes, including a GLOBAL storage scope where data is readable by all apps of any group of all users regardless of mobile device.

7. The system of any of examples 1-6 wherein the datastore comprises multiple storage scopes comprising:
    a LOCAL storage scope where data corresponding to an app is readable only by the app running on a single mobile device;
    a DEVICE storage scope where data corresponding to a mobile device is readable by all apps on the mobile device;
    an APP storage scope where data is readable by an app running on any mobile device;
    a GROUP storage scope where data is readable by all apps on all mobile devices in the same app group;
    a USER storage scope where data is readable by all apps of any group of a user regardless of mobile device; and
    a GLOBAL storage scope where data is readable by all apps of all any group of a user regardless of mobile device.

8. The system of any of examples 1-7 wherein at least one app is in multiple groups.

9. The system of any of examples 1-8 wherein the context information is transferred between apps via a switch to method in a class that contains information corresponding to each app object.

10. The system of example 9 wherein the context information transferred via the switch to method includes parameters and attributes.

11. The system of any of examples 1-10 wherein applications are grouped by an SDH View class that creates a view of each app for one user that is platform independent.

12. The system of example 11 wherein the SDH view class contains methods to view, add, and remove apps from a group.

13. A method comprising:
running a first app on a mobile device;
sending first app context information to a back end;
switching from the first app to a second app; and
providing the context information from the first app to the second app.

14. The method of example 13 wherein the first app and the second app are in a same group of apps.

15. The method of any of examples 13-14 wherein the first app context Information is available to the second app in accordance with a selected one of the following storage modes:
    a DEVICE modestorage scope where data corresponding to a mobile device is readable by all apps on the mobile device;
    an APP storage scope where data is readable by an app running on any mobile device;
    a GROUP storage scope where data is readable by ail apps on all mobile devices in the same app group;
    a USER storage scope where data is readable by all apps of any group of a user regardless of mobile device; and
    a GLOBAL storage scope where data is readable by all apps of all groups of all users regardless of mobile device.

16. The method of any of examples 13-15 wherein the second app is running on the first mobile device and wherein the first app context information is available to the second app in accordance with a selected one of the following storage scopes:
    a DEVICE storage scope where data corresponding to a mobile device is readable by all apps on the mobile device;
    a GROUP storage scope where data is readable by all apps on all mobile devices in the same app group; and
    a GLOBAL storage scope where data is readable by all apps of all groups of all users regardless of mobile device.

17. The method of any of examples 13-16 wherein the second app is running on a second separate device and wherein the first app context information is available to the second app in accordance with a selected one of the following storage scopes:
  an APP storage scope where data is readable by an app running on any mobile device;
  a GROUP storage scope where data is readable by all apps on all mobile devices in the same app group; and
  a GLOBAL storage scope where data is readable by all apps of all groups of all users regardless of mobile device.

18. A computer readable storage device having instructions for causing a computer to perform a method the method comprising:
  managing a library having a plurality of apps for mobile devices, the apps divided into groups of related apps;
  communicating with multiple mobile devices running apps; and
  providing interconnectivity between apps in each group such that a first app has context information shared with a second app.

19. The computer readable storage device of example 18 wherein providing interconnectivity between apps comprises managing multiple storage scopes, including a LOCAL storage scope where data corresponding to an app is readable only by the app running on a single mobile device.

20. The computer readable storage device of any of examples 18-19 wherein providing interconnectivity between apps comprises managing multiple storage scopes comprising:
  a LOCAL storage scope where data corresponding to an app is readable only by the app running on a single mobile device;
  a DEVICE storage scope where data corresponding to a mobile device is readable by all apps on the mobile device;
  an APP storage scope where data is readable by an app running on any mobile device;
  a GROUP storage scope where data is readable by all apps on all mobile devices in the same app group;
  a USER storage scope where data is readable by all apps of any group of a user regardless of mobile device; and
  a GLOBAL storage scope where data is readable by all apps of all groups of all users regardless of mobile device.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system comprising:
  a mobile communication device including a non-transitory storage device including:
    a library stored on the storage device and having a plurality of apps for execution on the mobile communication device, the plurality of apps divided into groups of apps for which app context information is shared between the apps on the mobile communication device, and wherein any one app of the plurality of apps may belong to more than one group of the groups of apps;
    the library comprising a user interface to display the plurality of apps on the mobile communication device based on the groups of apps, the user interface further providing a component to switch between the plurality of apps on the mobile communication device based on a user request;
    a communications module stored on the storage device for execution by the mobile communication device to communicate with multiple mobile communication devices; and
    a data store module providing interconnectivity between the plurality of apps in each group of apps, the data store module storing app data including app context information and a storage scope associated with the app context information that defines access rights based on relationships between the plurality of apps on the mobile communication device, such that a first app of the plurality of apps automatically transfers app context information to a second app of the plurality of apps on the mobile communication device in accordance with the storage scope associated with the app context information, when a user of the mobile communication device requests a switch from the first app to the second app, and
    wherein the first app and the second app are in a same group of apps.

2. The system of claim 1 wherein the storage scope includes a LOCAL storage scope where the app data is readable only by the app running on the mobile communication device.

3. The system of claim 1 wherein the storage scope includes a DEVICE storage scope where the app data is readable by all apps on the mobile communication device.

4. The system of claim 1 wherein the storage scope includes an APP storage scope where the app data is readable by an app running on any of the multiple mobile communication devices.

5. The system of claim 1 wherein the storage scope includes a GROUP storage scope where the app data is readable by all apps on the multiple mobile communication devices in the same app group and wherein the app context information shared by the first app is transferred to the second app upon switching from the first app to the second app, and wherein the second app is a different app in the app group.

6. The system of claim 1 wherein the storage scope includes a GLOBAL storage scope where the app data is readable by all apps of any group regardless of the mobile communication device on which the apps are running.

7. The system of claim 1 wherein the storage scope includes a USER storage scope where the app data is readable by all apps of the plurality of the apps of any group of a user regardless of the mobile communication device on which the apps are running.

8. A method comprising:
  displaying, on a mobile communication device, a plurality of apps based on logical groupings of the plurality of apps by which the plurality of apps are divided into groups of apps for which app context information is shared between the apps on the mobile communication device, wherein any one app of the plurality of apps may belong to more than one group of the groups of apps;
  running a first app of the plurality of apps on the mobile communication device;
  sending, by the mobile communication device, app context information associated with the first app to a back end storage device, the app context information having an associated storage scope defining access permissions based on the logical groupings of apps;

switching, by the mobile communication device, from the first app of the plurality of apps, to a second, different app of the plurality of apps in response to a user of the mobile communication device requesting a switch to the second app;

determining, by the mobile communication device, that the first app context information can be provided to the second app based on the associated storage scope associated with the first app context information; and automatically providing, via the back end storage device, the first app context information from the first app to the second app in accordance with the associated storage scope, and wherein the first app and the second app are in a same group of apps.

9. The method of claim 8 wherein the first app context information is available to the second app in accordance with a selected one of the following storage scopes:

a DEVICE storage scope where the app context information corresponding to the mobile communication device is readable by all apps on the mobile communication device;

an APP storage scope where the app context information is readable by an app running on any mobile communication device;

a GROUP storage scope where the app context information is readable by all apps on all mobile communication devices in the same app group;

a USER storage scope where the app context information is readable by all apps of any group of a user regardless of mobile communication device; and a GLOBAL storage scope where the app context information is readable by all apps of all groups of all users regardless of mobile communication device.

10. A non-transitory computer readable storage device having instructions for causing a computer to perform operations comprising:

displaying on a mobile communication device, a plurality of apps based on logical groupings of the plurality of apps by which the plurality of apps are divided into groups of apps for which app context information is shared between the apps on the mobile communication device, wherein any one app of the plurality of apps may belong to more than one group of the groups of apps;

running a first app of a plurality of apps on the mobile communication device;

sending app context information associated with the first app to a back end storage device, the app context information having an associated storage scope defining access permissions based on the logical groupings of apps;

switching from the first app of the plurality of apps, to a second, different app of the plurality of apps in response to a user of the mobile communication device requesting a switch to the second app;

determining that the first app context information can be provided to the second app based on the associated storage scope associated with the first app context information; and automatically providing the first app context information from the first app to the second app in accordance with the associated storage scope, and wherein the first app and the second app are in a same group of apps.

11. The non-transitory computer readable storage device of claim 10, wherein the storage scope includes a LOCAL storage scope where the app context information corresponding to an app is readable only by the app running on a single mobile communication device.

12. The non-transitory computer readable storage device of claim 10, wherein the storage scope includes one of the following:

a DEVICE storage scope where the app context information corresponding to the mobile communication device is readable by all apps on the mobile communication device;

an APP storage scope where the app context information is readable by an app running on any mobile communication device;

a GROUP storage scope where the app context information is readable by all apps on all mobile communication devices in the same app group;

a USER storage scope where the app context information is readable by all apps of any group of a user regardless of the mobile communication device; and a GLOBAL storage scope where the app context information is readable by all apps of all groups of all users regardless of the mobile communication device.

13. A system comprising:

a mobile communication device including a non-transitory storage device including:

a library stored on the storage device and having a plurality of apps for execution on the mobile communication device, the apps divided into corresponding groups of apps for which app context information is shared and wherein any one app of the plurality of apps may belong to more than one group of the groups of apps;

a communications module stored on the storage device for execution by the mobile communication device to communicate with multiple mobile communication devices via a wireless network; and a data store module providing interconnectivity between apps in each group by accessing a backend storage of a network connected device via the communications module to obtain data, including context information, corresponding to each app, the data having an associated storage scope defining app access rights, wherein a LOCAL storage scope allows access to the data by the corresponding app, and a GROUP storage scope allows access to the data by all apps in the corresponding group such that the app context information is available to other apps according to the associated storage scope when switching between apps based on a user of the mobile communication device requesting a switch between apps.

14. The system of claim 13 wherein an APP storage scope allows access to the data by the corresponding app regardless of a device it is executing on.

15. The system of claim 13 wherein a DEVICE storage scope allows access to the data by all apps executing on the mobile communication device.

16. The system of claim 13 wherein a USER storage scope allows access to the data by all apps of any group of a user.

* * * * *